(12) United States Patent
Doy et al.

(10) Patent No.: US 12,129,607 B2
(45) Date of Patent: Oct. 29, 2024

(54) CONTROL SYSTEM AND METHOD FOR DEFINING AND GENERATING COMPACTOR WORK AREA

(71) Applicant: Caterpillar Paving Products Inc., Brooklyn Park, MN (US)

(72) Inventors: Nathaniel S. Doy, Maple Grove, MN (US); John L. Marsolek, Watertown, MN (US); David Edwin Gerding, Maple Grove, MN (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 338 days.

(21) Appl. No.: 17/535,045

(22) Filed: Nov. 24, 2021

(65) Prior Publication Data
US 2023/0160152 A1 May 25, 2023

(51) Int. Cl.
*E01C 19/00* (2006.01)
*B60K 35/00* (2024.01)
*B60K 35/28* (2024.01)
*B60Q 9/00* (2006.01)
*E01C 19/26* (2006.01)

(52) U.S. Cl.
CPC ............ *E01C 19/004* (2013.01); *B60K 35/00* (2013.01); *B60Q 9/008* (2013.01); *B60K 35/28* (2024.01); *B60K 2360/166* (2024.01); *B60K 2360/178* (2024.01); *E01C 19/26* (2013.01)

(58) Field of Classification Search
CPC ...... E01C 19/004; E01C 19/26; E01C 19/286; E01C 19/283; E01C 19/288; B60K 35/00; B60K 2370/166; B60K 2370/178; B60K 2370/152; B60K 2370/175; B60K 37/06; B60Q 9/008; B60Y 2200/413; G08G 1/207
See application file for complete search history.

(56) References Cited

U.S. PATENT DOCUMENTS

| | | | |
|---|---|---|---|
| 9,982,397 B2 | 5/2018 | Korb et al. | |
| 11,054,831 B2 | 7/2021 | O'donnell et al. | |
| 11,168,992 B2* | 11/2021 | Uoya | A01B 79/005 |
| 2020/0050208 A1* | 2/2020 | Frick | G06V 10/462 |
| 2020/0089230 A1 | 3/2020 | Oetken et al. | |
| 2020/0356088 A1* | 11/2020 | Schlacks, IV | G05D 1/0295 |
| 2021/0339768 A1* | 11/2021 | Kakkar | A01B 79/005 |
| 2022/0382291 A1* | 12/2022 | Suzuki | A01B 69/008 |

FOREIGN PATENT DOCUMENTS

DE 102019002442 10/2020

* cited by examiner

*Primary Examiner* — Abby Y Lin
*Assistant Examiner* — Dylan M Katz

(57) ABSTRACT

A control system for a compactor is disclosed. The control system can include any one or combination of one or more position sensors, a steering system, a control interface and a controller. The controller can be in communication with at least the control interface and the one or more position sensors. The controller can be configured to receive data recording a position of the compactor when physically operating the compactor along at least a portion of the desired boundary of a compaction area, determine from the data a virtual boundary of the compaction area corresponding to the position of the compactor when physically operating the compactor along the desired boundary of the compaction area, and generate at least a first work plan for operating the compactor to compact in the compaction area up to the virtual boundary.

19 Claims, 9 Drawing Sheets

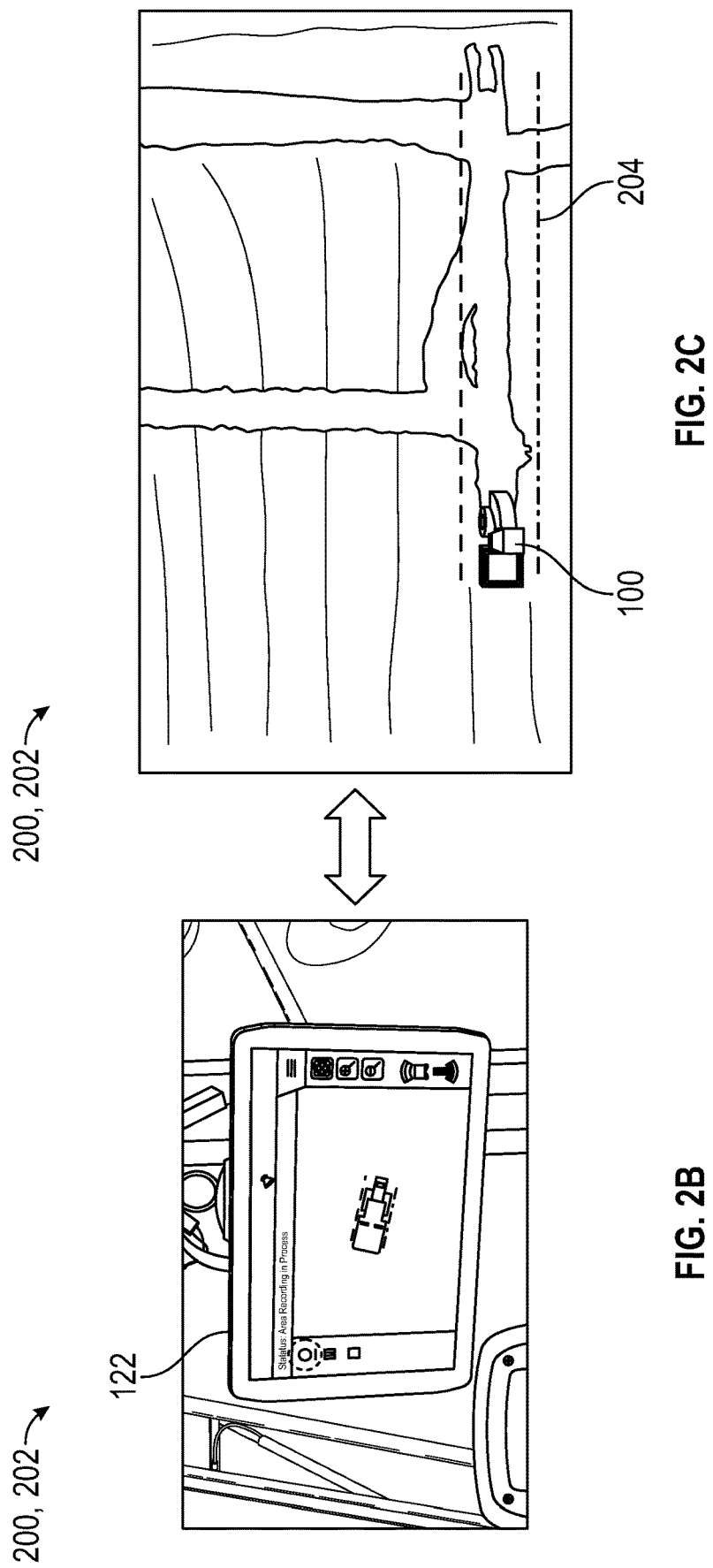

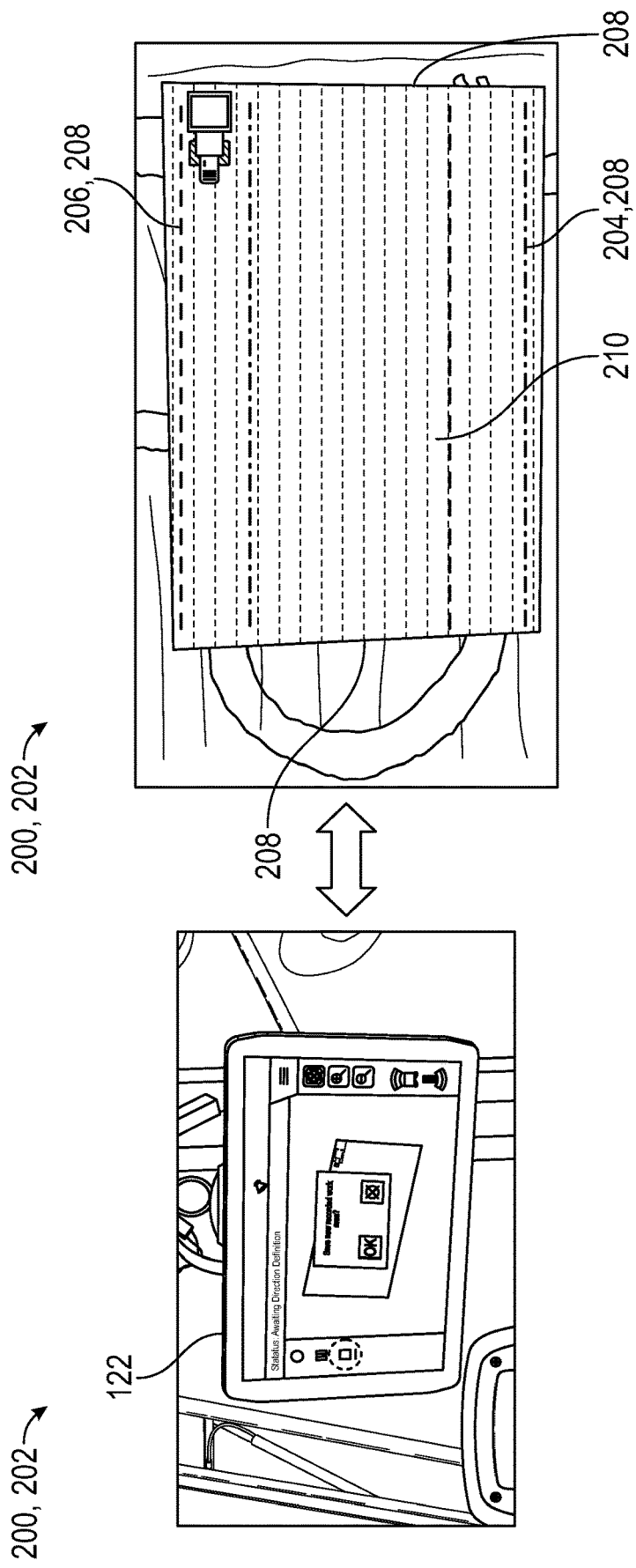

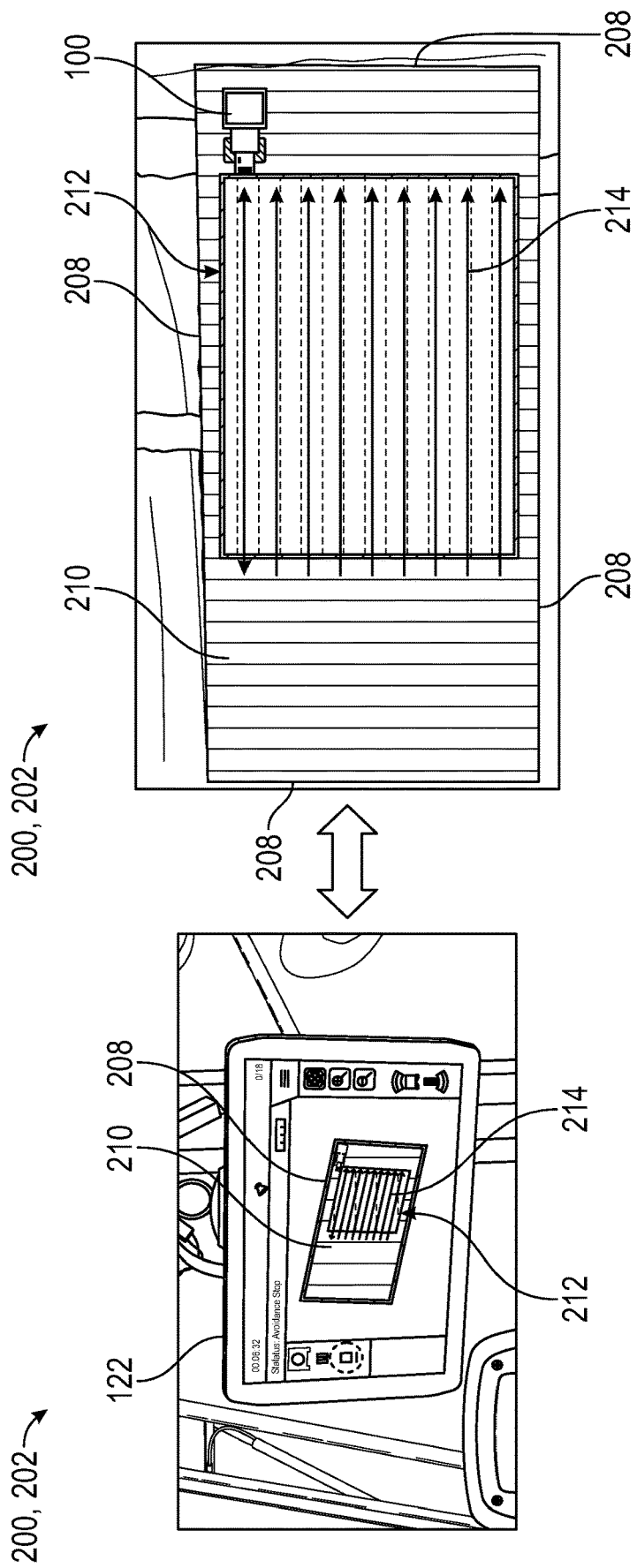

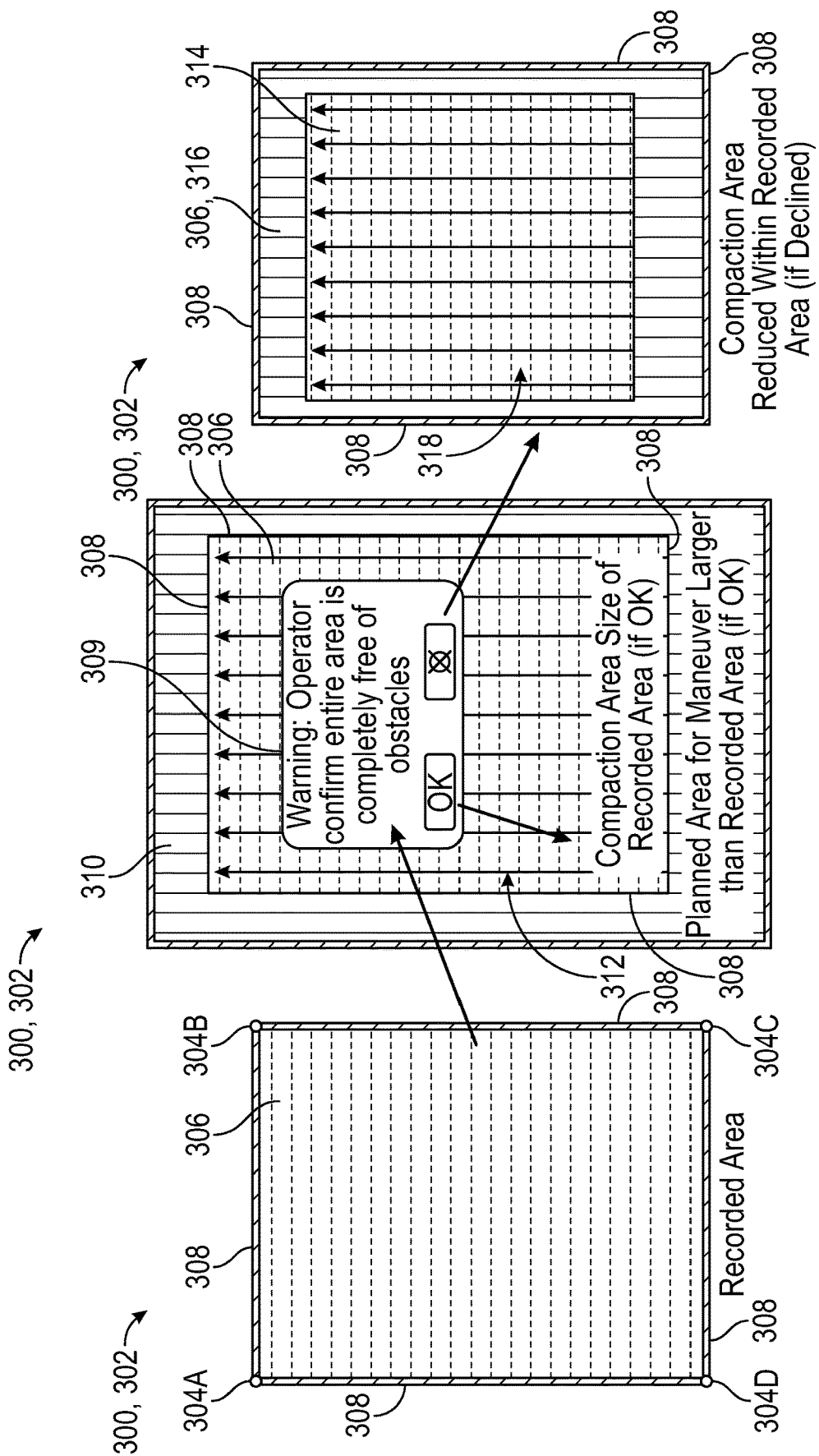

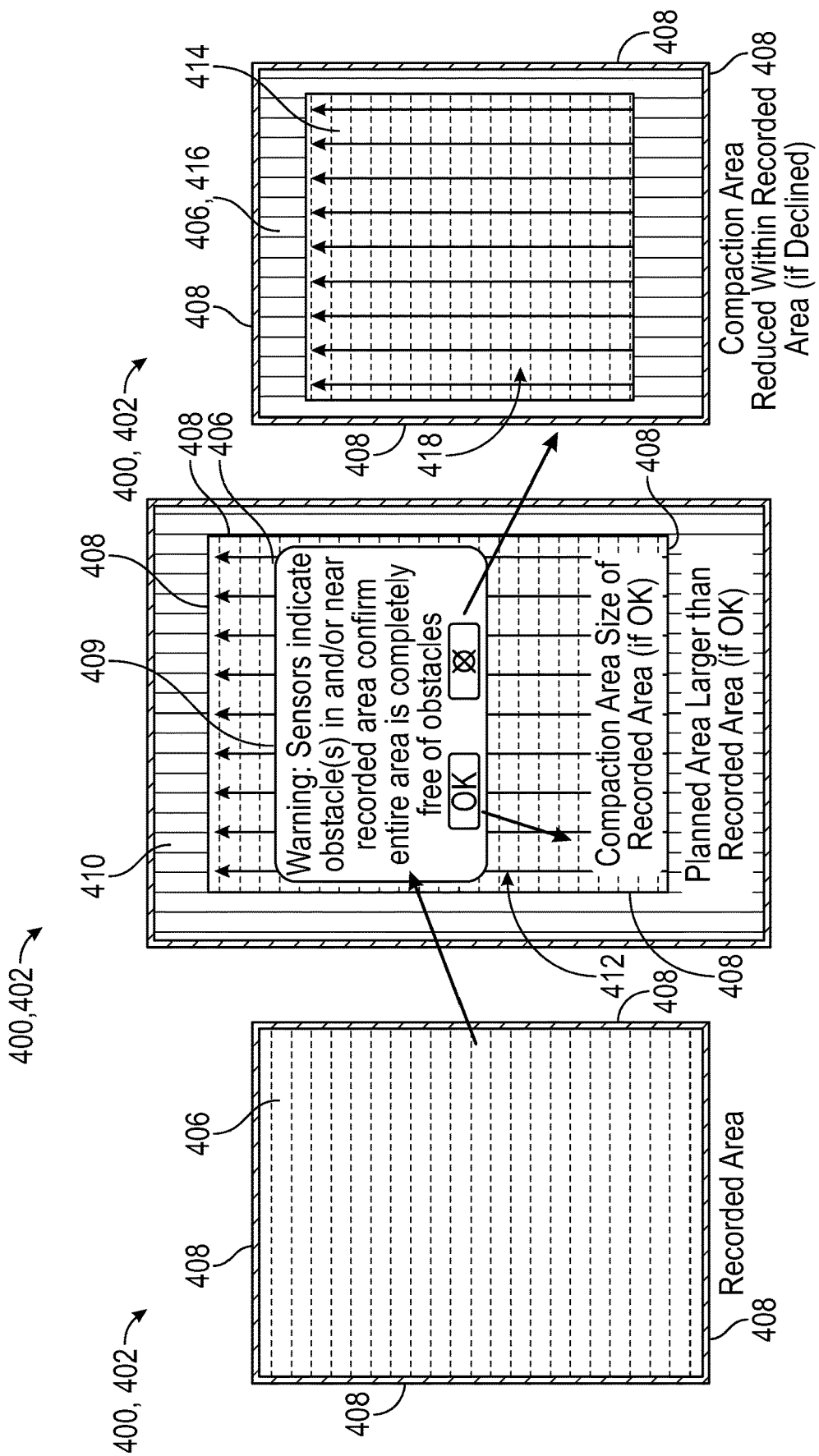

CONTROL SYSTEM AND METHOD FOR DEFINING AND GENERATING COMPACTOR WORK AREA

TECHNICAL FIELD

The present disclosure generally relates to a control systems and methods for a work machine. More particularly, the present disclosure relates to control systems and methods for defining and generating a perimeter of a work area to be compacted by a compactor.

BACKGROUND

Work machines, such as compactors, can be used for compacting substrates. Compactors are employed for compacting soil, gravel, fresh laid asphalt, and other compactable materials associated with worksite surfaces. For example, during construction of roadways, highways, parking lots and the like, one or more compactors are typically utilized to compact soil, stone, and/or recently laid asphalt.

To assist with the compaction process and to improve compaction quality, a compactor may be equipped to operate in an autonomous or semi-autonomous mode as described in in U.S. Pat. No. 11,054,831B2. In such modes of operation, the compactor operates at least in part under computer control. In preparation for computer control, the control system obtains geographical coordinates of its position such as via a Global Positioning System (GPS). A perimeter of a worksite can be obtained using the geographical coordinates. The control system then develops a work plan including paths for traversing the surface of the compaction area while performing compacting. The control system assumes that terrain outside the perimeter may be dangerous for the operator or unsuitable for compaction. To avoid inadvertent movement outside the perimeter, the work plan reduces the size of the compaction area and adds a safety or buffer zone between the compaction area and the perimeter. This safety or buffer zone provides some area where the compactor may maneuver (e.g., turn) but not compact. This safety or buffer zone helps ensure safety; however, the resulting compaction area inside the safety or buffer zone is smaller than the perimeter that was originally intended and defined, making the compaction area smaller in area than was originally sought by the operator.

Various methods for defining a boundary for a compaction area are known and use a methodology as described above using safety or buffer zones. Examples of such methodology (in addition to U.S. Pat. No. 11,054,831B2) include U.S. Pat. No. 9,982,397, United States Patent Application Publication No. 2020/0089230 and German Patent Application No. DE102019002442A1. These examples all result in the compaction area being less than was originally sought by the operator.

SUMMARY

In an example according to this disclosure, a control system for a compactor is disclosed. The control system can include any one or combination of one or more position sensors, a steering system, a control interface and a controller. The one or more position sensors can sense data regarding a position of the compactor. The steering system can steer the compactor along a desired path of travel. The control interface can initiate a recording of the position of the compactor using the one or more position sensors when physically operating the compactor using the steering system along a desired boundary of a compaction area. The controller can be in communication with at least the control interface and the one or more position sensors. The controller can be configured to receive the data recording the position of the compactor when physically operating the compactor along at least a portion of the desired boundary of the compaction area, determine from the data a virtual boundary of the compaction area corresponding to the position of the compactor when physically operating the compactor along the desired boundary of the compaction area, and generate at least a first work plan for operating the compactor to compact in the compaction area up to the virtual boundary.

In one example, a machine implemented method of controlling operation of a compactor is disclosed. The method can include recording one or more positions of the compactor while steering the compactor along a desired boundary of a compaction area, using the recording of the position along the desired boundary to define a virtual boundary generated by a controller of the compactor, providing one or more prompts to an operator regarding a presence of one or more obstacles in or adjacent the compaction area, and determining a work plan for the compactor to compact within the compaction area according to an operator response to the one or more prompts and the virtual boundary In one example, a compactor is disclosed. The compactor can include any one or any combination of a substantially cylindrical drum, a frame, a steering system, one or more position sensors, a control interface and a controller. The substantially cylindrical drum can be configured to compact a surface as the compactor traverses a work area. The frame can support the drum. The steering system can steer the compactor along a desired path of travel. The one or more position sensors can sense a location of the compactor. The control interface can initiate a recording of the position of the compactor using the one or more position sensors when physically operating the compactor using the steering system along a desired boundary of a compaction area. The controller can be in communication with at least the control interface and the one or more position sensors. The controller can be configured to receive data recording the position of the compactor when physically operating the compactor along at least a portion of the desired boundary of the compaction area, determine from the data a virtual boundary of the compaction area corresponding to the position of the compactor when physically operating the compactor along the desired boundary of the compaction area, and generate at least a first work plan for operating the compactor to compact in the compaction area up to the virtual boundary.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 2A-2K depict a method and a control system of generating a work plan for compaction with the compaction in accordance with an example of the present disclosure.

FIGS. 3A-3C are schematic diagrams of a control system and method of generating a work plan for the compactor in accordance with an example of the present disclosure.

FIGS. 4A-4C are schematic diagrams of another control system and method of generating a work plan for the compactor in accordance with an example of the present disclosure.

DETAILED DESCRIPTION

Figure 1:
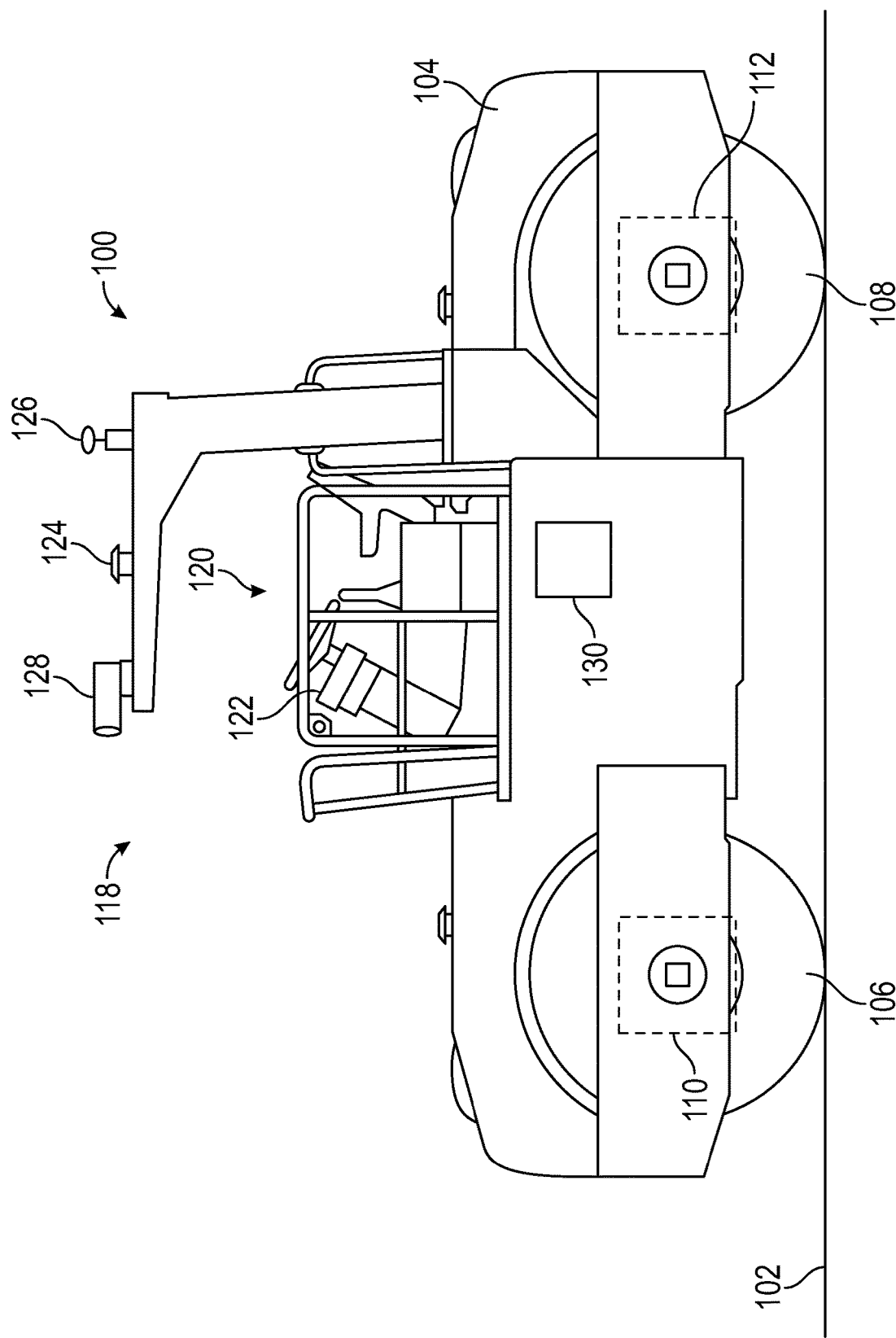
FIG. 1 is a side view of a compactor in accordance with an example of the present disclosure.

FIG. 1 shows a side view of a work machine, such as an example compactor 100, in accordance with one embodiment. The compactor 100 may be configured for use in, for example, road construction, highway construction, parking lot construction, and other paving, soil compaction and/or construction applications. For example, the compactor 100 may be used in situations where it is necessary to compress loose stone, gravel, soil, sand, concrete, and/or other materials of a worksite surface 102 to a state of greater compaction and/or density. Similarly, the compactor 100 can compress freshly deposited asphalt or other materials disposed on and/or associated with the worksite surface 102. As the compactor 100 traverses the worksite surface 102, vibrational forces generated by the compactor 100 and imparted to the worksite surface 102, acting in cooperation with the weight of the compactor 100, compresses the loose materials. The compactor 100 typically makes one or more passes over the worksite surface 102 to provide a desired level of compaction. Although described subsequently in reference to the compactor 100, the methods, systems, techniques of the present application are equally applicable to other working machines such earth moving equipment, mining equipment and other paving equipment that operate in a defined worksite area where a defined worksite periphery is desired.

The compactor 100 includes a frame 104, a first drum 106, and a second drum 108. The first drum 106 and the second drum 108 are rotatably coupled to the frame 104 so that the first drum 106 and the second drum 108 roll over the worksite surface 102 as compactor 100 travels. The first and second drums 106, 108 comprise substantially cylindrical drums and/or other compaction elements of the compactor 100, and the first and second drums 106, 108 can be configured to apply vibration and/or other forces to the worksite surface 102 in order to assist in compacting the worksite surface 102. Although illustrated in FIG. 1 as having first and second drums 106 and 108, according to other examples the compactor 100 can have only a single drum or three or more drums. Although the first and second drums 106 and 108 are shown with a substantially smooth circumference or outer surface, in other examples, the first drum 106 and/or the second drum 108 may be tapered and/or can include ground engaging tools such as teeth, pegs, extensions, pads, or other features. Such ground-engaging tools can assist in breaking-up at least some of the materials associated with the worksite surface 102 and/or otherwise assist in compacting the worksite surface 102.

The first drum 106 can have the same or different construction as the second drum 108. In some examples, the first drum 106 and/or the second drum 108 is an elongated, hollow cylinder with a cylindrical drum shell that encloses an interior volume. The first drum 106 defines a first central axis about which the first drum 106 rotates, and similarly, the second drum 108 defines a second central axis about which the second drum 108 rotates.

The first drum 106 can include a first vibratory mechanism 110 within the cylindrical drum shell, and the second drum 108 can include a second vibratory mechanism 112 within the cylindrical drum shell. While the first drum 106 is illustrated as having a first vibratory mechanism 110 and second drum 108 is illustrated as having a second vibratory mechanism 112, in other examples only one of the first and second drums 106, 108 may include a vibratory mechanism. The first and second vibratory mechanisms 110, 112 may include one or more weights or masses disposed at a position off-center from the respective central axis around which the first and second drums 106, 108 rotate. As first and second drums 106, 108 rotate, the off-center or eccentric positions of the masses induce oscillatory or vibrational forces to the first and second drums 106, 108, and such forces are imparted to the worksite surface 102. The weights are eccentrically positioned with respect to the respective central axis around which first and second drums 106, 108 rotate, and such weights are typically movable with respect to each other (e.g., about the respective central axis) to produce varying degrees of imbalance during rotation of first and second drums 106, 108. The amplitude of the vibrations produced by such an arrangement of eccentric rotating weights may be varied by modifying and/or otherwise controlling the position of the eccentric weights with respect to each other, thereby varying the average distribution of mass (i.e., the centroid) with respect to the axis of rotation of the weights. The present disclosure is not limited to these examples described above.

The compactor 100 of FIG. 1 is purely exemplary and can include other configurations (e.g., tow-behind, pushed, belt, etc.). The compactor 100 can be autonomous or semi-autonomous. The compactor 100 can be equipped with various sensors making autonomous or semi-autonomous operation feasible including those that can sense obstacle(s) adjacent the compactor 100. The various sensors can include one or more compaction sensors as known in the art to determine type of material, material density, material stiffness, and/or other characteristics of worksite surface 102. One or more sensors can also measure a vibration amplitude, a vibration frequency, a speed of the eccentric weights associated with first drum 106 and/or the second drum 108, a distance of such eccentric weights from the axis of rotation, a speed of rotation of the first drum 106 and/or the second drum 108, etc.

The compactor 100 includes an operator station 118. However, the operator station 118 is not contemplated if the compactor 100 is fully autonomous. The operator station 118 includes a steering system 120 including a steering wheel, levers, pedals, and/or other controls (not shown) for steering the compactor 100 along a desired path of travel. The operator station 118 can have components and/or systems that are not specifically shown such as a throttle, brake system, etc. for operation of the compactor 100. Using the operator station 118, an operator of compactor 100 can adjust a speed, travel direction, and/or other aspects of compactor 100 during use.

The operator station 118 also includes a control interface 122 for controlling various functions of compactor 100. However, in some examples it is contemplated that control interface 122 can be remote and offboard of the compactor 100. The control interface 122 comprises one or more an analog, digital, and/or touchscreen displays. The control interface 122 can be configured to display, for example, at least part of a travel path, a work plan and/or at least part of a virtual boundary of the present disclosure. The control interface 122 can support other functions, including for example, initiating recording of position data as further discussed herein, displaying various operating data and communicating with various systems onboard and offboard the compactor 100.

The compactor 100 further includes one or more position sensors 124. These can be located in any position on the compactor 100 such as on the frame 104. The one or more position sensors 124 can determine a location of compactor 100 and can comprise a component of a global positioning system (GPS). In one example, the one or more position sensors 124 comprise a GPS receiver, a GPS transmitter, a GPS transceiver or other such device, and the one or more position sensors 124 can be in communication with one or more GPS satellites (not shown) to determine a location of the compactor 100. Such determination of the location and/or recording of the location of the compactor 100 can be initiated by the operator using the control interface 122 as further described herein.

The compactor 100 may also include a communication device 126 configured to enable the compactor 100 to communicate with the one or more other machines, and/or with one or more remote servers, processors, or control systems located remote from the worksite at which the compactor 100 is being used. The communication device 126 can also be configured to enable the compactor 100 to communicate with one or more electronic devices located at the worksite. In some examples, the communication device 126 includes a receiver configured to receive various electronic signals including position data, navigation commands, real-time information, and/or project-specific information. In some examples, the communication device 126 is also configured to receive signals including information indicative of compaction requirements specific to worksite surface 102. Such compaction requirements may include, for example, a number of passes associated with the worksite surface 102 and required in order to complete the compaction of worksite surface 102, a desired stiffness, density, and/or compaction of worksite surface 102, a desired level of efficiency for a corresponding compaction operation, and/or other requirements. The communication device 126 may further include a transmitter configured to transmit position data indicative of a relative or geographic position of the compactor 100, as well as electronic data such as data acquired via one or more sensors of the compactor 100.

The compactor 100 can include one or more obstacle detection sensors 128. These can include one or more of a camera, LiDAR, radar, and/or ultrasonic sensor(s) as known in the art. If a camera is utilized such camera can be a digital camera capable of various uses in addition to obstacle detection. The camera can provide visual feeds such as to record and/or transmit digital video of the worksite surface 102, obstacle(s) in or adjacent the worksite in real-time. In still other examples, camera can comprise an infrared sensor, a thermal camera, or other like device configured to record and/or transmit thermal images of the worksite surface 102 in real-time.

The compactor 100 also includes a controller 130 in electronic communication with various components including the steering system 120, control interface 122, one or more position sensors 124, communication device 126, one or more obstacle detection sensors 128, and/or other components of compactor 100. The controller 130 receives one or more signals from the one or more position sensors 124 including information indicating a location of compactor 100. In some examples, the controller 130 using data from one or more position sensors 124 may be configured to determine the location of compactor 100 as compactor 100 traverses a boundary (periphery) of worksite surface 102 and/or as compactor 100 travels to any other worksite location. As discussed previously, the control interface 122 can in some instances be used to initiate communication (such as a recording) of the location of the compactor 100. The location of compactor 100 can include GPS coordinates of a plurality of distinct points such as at corners of the boundary and/or a plurality of points along two or more steered paths (travel paths) of the compactor 100. Such data may be determined substantially continuously during movement of compactor 100 such as at initiation of the operator using the control interface 122 to initiate recording of the position. Alternatively, such information may be determined at regular time intervals (milliseconds, one second, two seconds, five seconds, ten seconds, etc.) as compactor 100 travels. Further, any such information can be stored in a memory associated with controller 130 as discussed below.

The controller 130 can be part of a broader control system that can include additional components including some of those already discussed. The controller 130 can include, for example, software, hardware, and combinations of hardware and software configured to execute several functions related to, among others, obstacle detection for the compactor 100. The controller 130 can be an analog, digital, or combination analog and digital controller including a number of components. As examples, the controller 130 can include integrated circuit boards or ICB(s), printed circuit boards PCB(s), processor(s), data storage devices, switches, relays, or any other components. Examples of processors can include any one or more of a microprocessor, a controller, a digital signal processor (DSP), an application specific integrated circuit (ASIC), a field-programmable gate array (FPGA), or equivalent discrete or integrated logic circuitry. Commercially available microprocessors can be configured to perform the functions of the controller 130. Various known circuits may be associated with controller 130, including power supply circuitry, signal-conditioning circuitry, actuator driver circuitry (i.e., circuitry powering solenoids, motors, or piezo actuators), and communication circuitry. In some examples, the controller 130 may be positioned on the compactor 100, while in other examples the controller 130 may be positioned at an off-board location (remote location) relative to the compactor 100.

The controller 130 can include a memory such as memory circuitry. The memory may include storage media to store and/or retrieve data or other information such as, for example, input data from the one or more position sensors 124, the communication device 126 and/or the one or more obstacle detection sensors 128. Storage devices, in some examples can be a computer-readable storage medium. The data storage devices can be used to store program instructions for execution by processor(s) of the controller 130, for example. The storage devices, for example, are used by software, applications, algorithms, as examples, running on and/or executed by the controller 130. The storage devices can include short-term and/or long-term memory and can be volatile and/or non-volatile. Examples of non-volatile storage elements include magnetic hard discs, optical discs, floppy discs, flash memories, or forms of electrically programmable memories (EPROM) or electrically erasable and programmable (EEPROM) memories. Examples of volatile memories include random access memories (RAM), dynamic random-access memories (DRAM), static random-access memories (SRAM), and other forms of volatile memories known in the art.

FIGS. 2A-2K illustrate aspects of a control system 200 and a method 202 that can be associated with a compactor (such as compactor 100 of FIG. 1). The control system 200 and/or the method 202 can define a virtual boundary of a compaction area within a worksite. This virtual boundary can correspond to a desired boundary for the compaction area. The desired boundary can be recorded or otherwise determined by physically operating the compactor along at least a portion of the desired boundary of the compaction area. Using the virtual boundary (corresponding to the desired boundary) and/or other input, the control system 200 and/or the method 202 can develop one or more work plans including at least first a work plan for operating the compactor to compact in the compaction area up to the virtual boundary in a manner discussed in more detail below. Aspects such as components of the control system 200 and/or method 202 have already been described in reference to the compactor 100 of FIG. 1.

The control system 200 can include one or more remote servers, processors, or other such computing devices such as the controller 130 (FIG. 2A), the communication device 126 (FIG. 1) and the control interface 122 (FIGS. 2A, 2B, 2D, 2F, 2H and 2J). In some examples, the communication device 126 (FIG. 1), the controller 130 (FIGS. 1 and 2A) and/or the control interface 122 can be connected to one another and/or otherwise in communication with one another and with various components such as the one or more position sensors 124, the one or more obstacle detection sensors 128, and/or other components of compactor 100 (see discussion regarding FIG. 1) or offboard components via a network. The network may be a local area network ("LAN"), a larger network such as a wide area network ("WAN"), or a collection of networks, such as the Internet. Protocols for network communication, such as TCP/IP, may be used to implement the network. Although examples are described herein as using a network such as the Internet, other distribution techniques may be implemented that transmit information.

FIGS. 2A-2K depict the control system 200 and method 202 performing various steps. The control system 200 and the method 202 can, in the context of software, include steps that represent computer-executable instructions stored in memory. When such instructions are executed by, for example, the controller 130, such instructions cause the controller 130, various components of control system 200, and/or compactor 100, generally, to perform operations. The computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 202 is described with reference to compactor 100 of FIG. 1 and the control system 200.

Figure 2A:
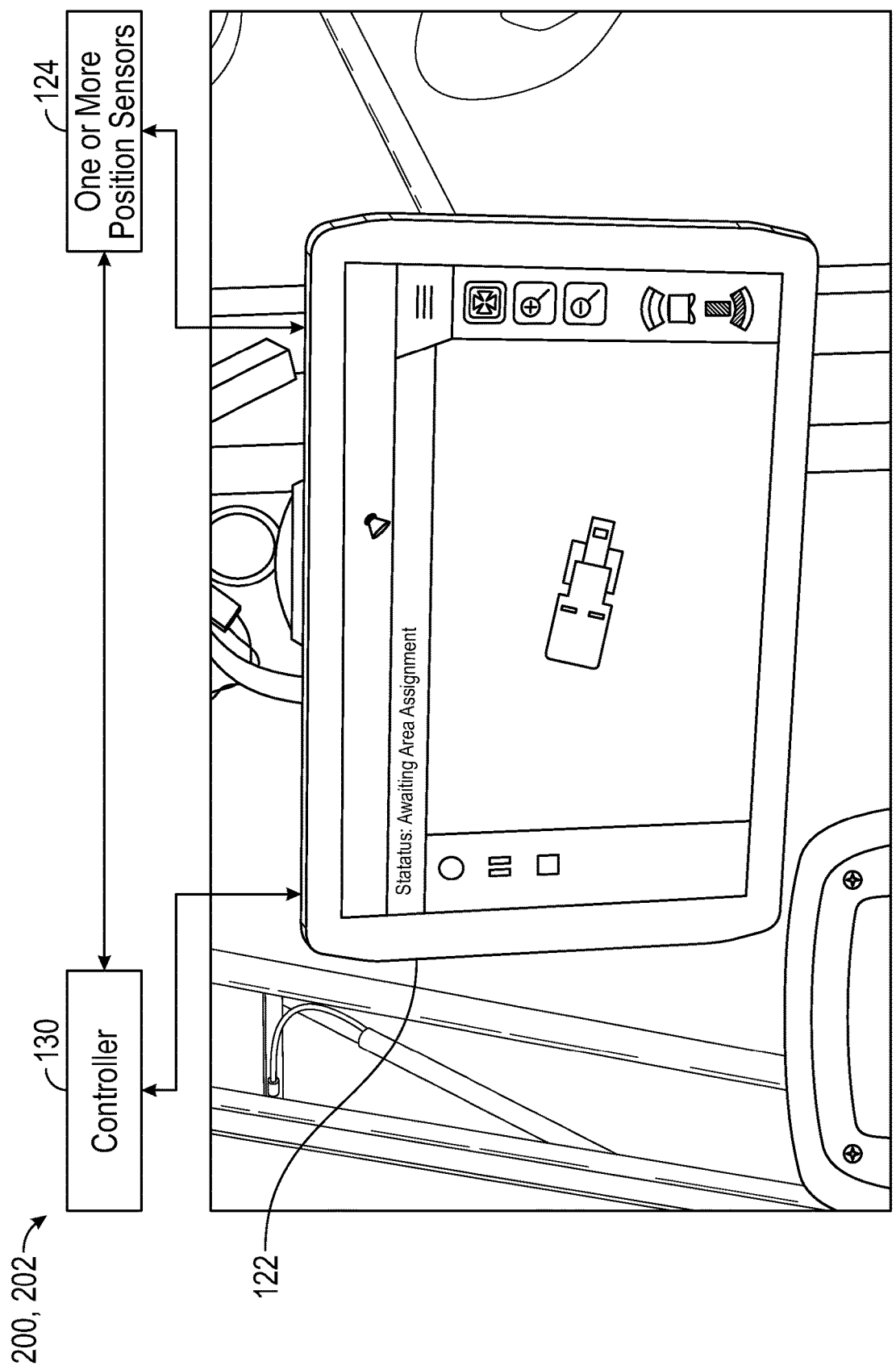

FIG. 2A shows the control interface 122 communicating with the one or more position sensors 124. The control interface 122 can initiate a location recording using the one or more position sensors 124 to define a virtual boundary as further discussed and illustrated. The control interface 122 and controller 130 are awaiting a compaction area assignment in FIG. 2A.

In FIG. 2B, the operator via the control interface 122 has initiated a location recording (see circled area on display and status) using the one or more position sensors 124 (FIGS. 1 and 2A). This recording and captured location information will be used by the controller 130 (FIGS. 1 and 2A) to define a virtual boundary, determine a compaction area and determine a work plan for the compaction area as further explained.

FIG. 2C shows the compactor 100 physically operating along a first desired boundary 204 for a compaction area. Such operation can be at the behest of and under control of the operator, for example. However, autonomous operation to define the first desired boundary 204 is also contemplated. In particular, the compactor 100 is being driven along a travel path that corresponds with the first desired boundary 204 during the location recording process of the method 202 as shown in FIG. 2B. The controller 130 (FIGS. 1 and 2A) can receive data recording the position of the compactor 100 when physically operating the compactor 100 along at least a portion of the first desired boundary 204 of the compaction area. The first desired boundary 204 can be visually displayed on the control interface 122 (FIG. 2B) indicated with one or more lines, such a parallel lines adjacent the lateral edges of the drum(s). Alternatively, the first desired boundary 204 can be displayed as bounded by lines or the like. According to further examples, lines or other representation of the first desired boundary 204 may not be visually displayed.

Figures 2D, 2E:
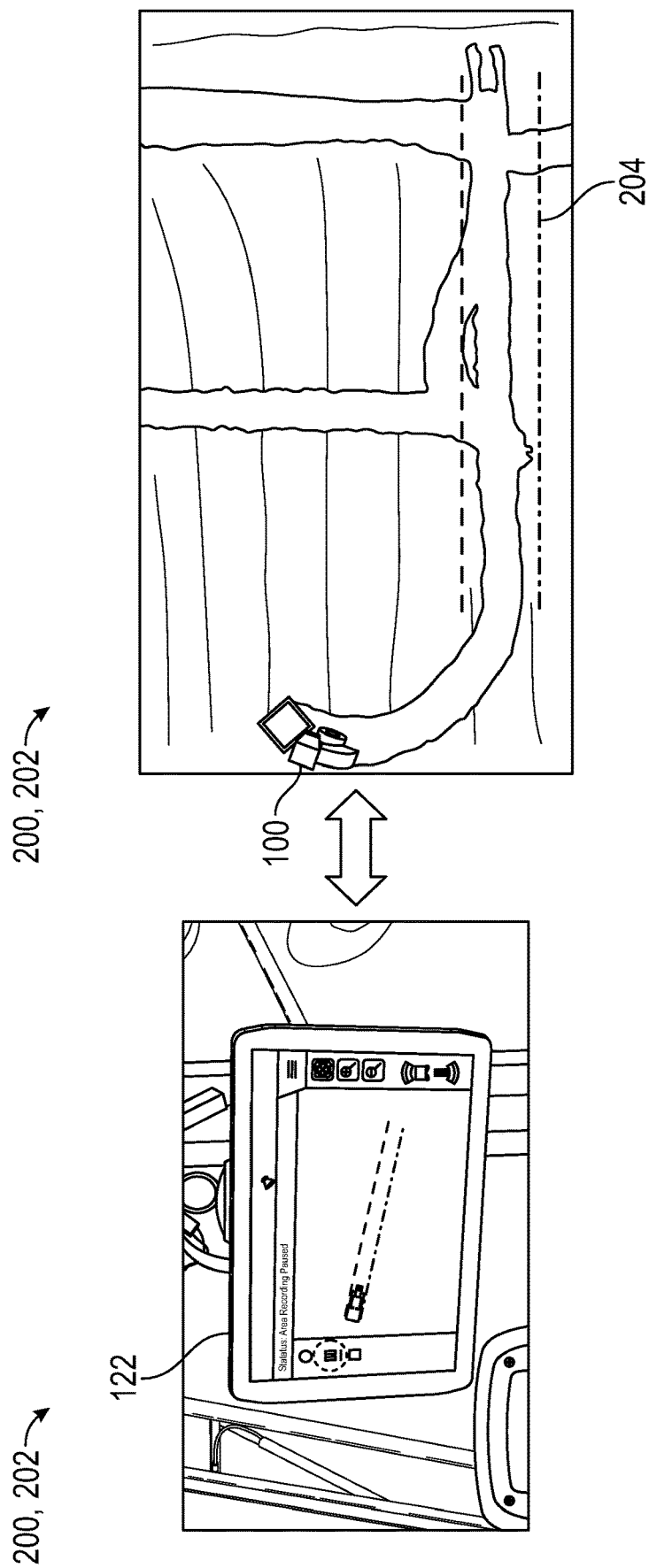

FIGS. 2D and 2E show that position recording used to define the first desired boundary 204 can be paused at operator discretion using the control interface 122. This can allow the operator to turn or otherwise maneuver the compactor 100 as shown in FIG. 2E as desired to a second (or subsequent) position where recording of location can resume.

Figures 2F, 2G:
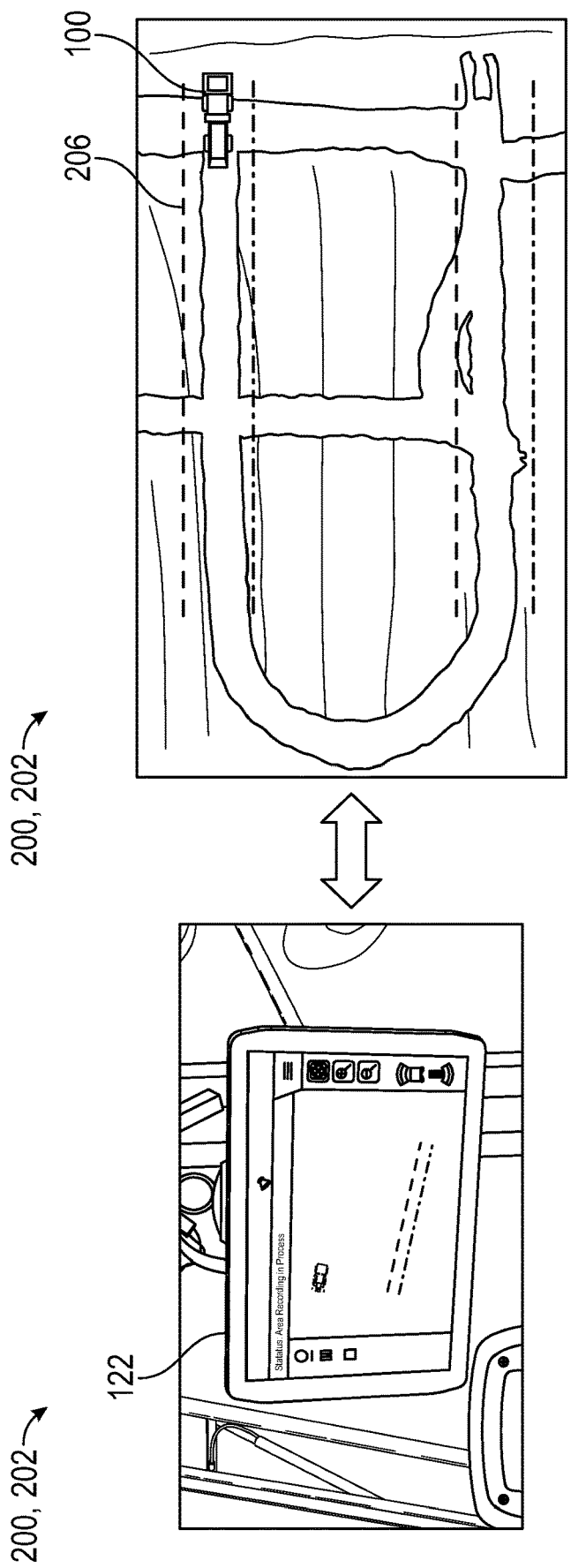

In FIGS. 2F and 2G, position recording can again be initiated using the control interface 122 (FIG. 2F) and the compactor 100 is physically operated along a second desired boundary 206 (FIG. 2G) for the compaction area. Again, the controller 130 (FIGS. 1 and 2A) can receive data recording the position of the compactor 100 when physically operating the compactor 100 along at least a portion of the second desired boundary 206 of the compaction area.

FIG. 2H shows data regarding the first desired boundary 204 and/or the second desired boundary 206 can be saved in memory at initiation of the control interface 122. This position data as defined by the location of the first desired boundary 204 and/or the second desired boundary 206 can be used to generate a virtual boundary 208 and a compaction area 210 as shown in FIG. 2I. As shown in FIG. 2I, the first desired boundary 204 and/or the second desired boundary 206 can correspond (e.g., be within GPS sensing accuracy) to the virtual boundary 208. It should be noted that at least a portion of the virtual boundary 208 and the compaction area 210 can be extrapolated, and therefore, is not based upon the first desired boundary 204 and/or the second desired boundary 206 or other position data derived from sensing on the compactor. Thus, according to the control system 200 and method 202, the controller 130 (FIGS. 1 and 2A) can determine from the data (regarding position) the virtual boundary 208 of the compaction area 210 corresponding to the position of the compactor 100 when physically operating the compactor along at least a portion of the desired boundary (the first desired boundary 204 and/or the second desired boundary 206) of the compaction area 210.

FIGS. 2J and 2K show a portion of a first work plan 212 generated by the controller 130 (FIGS. 1 and 2A) for automating compaction within the compaction area 210. Thus, the controller 130 can generate at least the first work plan 212 for operating the compactor 100 to compact in the compaction area 210 up to the virtual boundary 208 as shown in FIGS. 2J and 2K. Put another way, the compaction area 210 can extend up to the virtual boundary 208 corresponding to the first desired boundary 204 and/or the second desired boundary 206 where the compactor 100 was initially operated to gather position data. In this manner the compaction area 210 can correspond to the desired boundary for the work area initially set/delineated by the operator using recording of the position of the compactor.

The first work plan 212 can be displayed on the control interface 122 as shown in FIG. 2J. Control interface 122 can be configured as a user interface with the display of at least part of one or more travel paths 214 and/or other components of the first work plan 212. The control interface 122 can include for example, labels, location names, GPS coordinates of the respective locations, and/or other information associated with the work plan, and/or with operation data of the compactor 100. Data provided by user interface can be displayed and/or updated in real-time to assist the operator in controlling operation of compactor 100. The control interface 122 can depict a stage of operation in which the one or more travel paths 214 associated with the first work plan 212 has been determined to be completed. This can be provided for reference to the operator. The first work plan 212 can include visual indicia indicating, among other things, the virtual boundary 208, the one or more travel paths 214 of the compactor 100, a speed of compactor 100, a vibration frequency of the one or more drums, a vibration amplitude of one or more drums, and/or other operating parameters of compactor 100. In such examples, visual indicia could also indicate one or more other operating parameters.

FIG. 2J shows the first work plan 212 with the virtual boundary 208 as the outermost limit of the compaction area 210. The compactor 100 can travel, either autonomously, semi-autonomously or at direction of operation, to execute the first work plan 212. It is important to note that the first work plan 212 and compaction area 210 may not provide for a buffer area between the compaction area 210 and the virtual boundary 208 as has typically been the prior practice. This distinction will be discussed further in reference to FIGS. 3A-4C. Thus, with the first work plan 212, compaction is expected to be performed up to the virtual boundary 208. The one or more travel paths 214 can involve one or more straight paths that are traversed back-and-forth by compactor 100 while performing compacting. At the end of one straight path at the virtual boundary 208, an S-turn or K-turn (with vibration turned off) can be performed. This S-turn or K-turn can be performed outside of the virtual boundary 208, which differs from prior methods. Alternatively, once the virtual boundary 208 is reached at one end the straight path the straight path can be retraced in reverse by compactor 100 performing compacting without a turn. However, after retracing in reverse the straight line, an S-turn or a K-turn can then be performed outside of the virtual boundary 208, which differs from prior methods. A subsequent straight path of compacting can then be performed.

The controller 130 (FIGS. 1 and 2A) can cause control interface 122 to display one or more messages for the operator of compactor 100. For example, the controller 130 via the control interface 122 can display a message requesting that the operator approve the first work plan 212. Examples of this approval (or disapproval) process are shown in FIGS. 3A-4C. The control interface 122 can display and the operator can approve/disapprove of various work plans, travel paths, virtual boundaries, compaction areas, or other criteria (speed, vibration, etc.) via the control interface 122. The controller 130 may also cause the control interface 122 to display warnings, message or other indicia with one or more buttons, icons, and/or other data fields. Such data fields may comprise, for example, portions of the touch screen display, and/or other components of the control interface 122 configured to receive input (e.g., touch input) from the operator as previously illustrated in FIGS. 2A, 2B, 2D and 2F, for example. It is understood that various other controls of compactor 100 such as the steering, braking, throttle, etc. may also be used and can receive inputs from the controller 130 in performing the first work plan 212. In yet further examples, the control interface 122 and/or other components of compactor 100 may be configured to receive inputs such as from obstacle and other sensors. In some examples, the controller 130 can cause the control interface 122 to display one or more additional warnings such as via buttons, icons, and/or other controls as desired.

FIGS. 3A-3C shows a control system 300 and method 302 similar to those previously described. FIG. 3A differs from previously shown systems and methods in that position data can be gathered by operating the compactor to distinct points 304A, 304B, 304C and 304D corresponding to corners of a desired compaction area rather than by continuously gathering data along paths such as with the first desired boundary 204 and/or the second desired boundary 206 of FIGS. 2A-2K. FIG. 3A shows the distinct points 304A, 304B, 304C and 304D can be extrapolated to create a recorded area 306 (corresponding to a potential compaction area) bounded by a virtual boundary 308.

FIG. 3B differs from previously shown systems and methods in that the controller 130 (FIGS. 1 and 2A) can issue a warning 309 (e.g., via icon on the control interface 122). This warning can ask the operator to confirm the entire area (the recorded area 306) within the recorded boundary corresponding to the virtual boundary 308 and areas adjacent and outside the virtual boundary 308 are free of obstacles. If the operator confirms this by selecting "OK", the controller 130 will allow the compactor to compact the entire area corresponding to the recorded area 306 and this area of compaction will extend up to the virtual boundary 308. As shown, a larger area of maneuver 310 will also be generated by the controller 130 if "OK" is selected. This larger area of maneuver 310 will allow the compactor to perform turns, etc. without compacting vibration. This larger area of maneuver 310 will extend outside of the virtual boundary 308. The controller 130 can determine a work plan 312 within the recorded area 306 and this will extend compacting up to the virtual boundary 308 (and indeed, will extend operation of the compactor over the virtual boundary 308 into the larger area of maneuver 310 for turns, etc.).

However, as shown in FIG. 3C, should the operator decline to confirm (e.g., select "NO" or equivalent) in response to the warning, icon, etc. regarding obstacles, the controller 130 can reduce the area of actual compaction 314 in size from the recorded area 306. This area of actual compaction 314 will not extend up to the virtual boundary 308 but instead will be spaced within the virtual boundary 308 by a buffer zone 316 that allows for the compactor to maneuver without compacting for turns, etc. without crossing the virtual boundary 308. The controller, if "NO" is selected, can develop a second work plan 318 within the area of actual compaction 314 and can develop the buffer zone 316. This second work plan 318 will differ from the work plan 312. This second work plan 318 will not allow the compactor to cross the virtual boundary 308. Put another way, the area of actual compaction 314 as dictated by the second work plan 318 will be spaced within the virtual boundary 308 by the buffer zone 316.

FIGS. 4A-4C shows a control system 400 and method 402 similar to those previously described in reference to FIGS. 2A-3C. However, the FIGS. 4A-4C differ in that one or more obstacle detection sensors (such as the one or more obstacle detection sensors 128) can be utilized in alternative to or in combination with operator input. Thus, the controller, such as in FIG. 4B, can issue one or more warning 409 via an icon, etc. on the control interface 122. This warning can state that sensor(s) have sensed obstacles within or near a recorded area 406 of FIG. 4A and can ask the operator to confirm the entire area (the potential compaction area corresponding to the recorded area of FIG. 4A) within the recorded boundary corresponding to a virtual boundary 408 and areas adjacent and outside the virtual boundary 408 is free of obstacles. If the operator confirms this by selecting "OK", the controller 130 may allow the compactor to compact the entire area corresponding to the recorded area 406 (the area of potential compaction) and this area of potential compaction will extend up to the virtual boundary 408. As shown, a larger area of maneuver 410 can also be generated by the controller 130 if "OK" is selected. This larger area of maneuver 410 will allow the compactor to perform turns, etc. without vibration. This larger area of maneuver 410 will extend outside of the virtual boundary 408. The controller can determine a work plan 412 with in the recorded area 406 and the work plan 412 will have a compaction area that will extend up to the virtual boundary 408 (and indeed, the work plan 412 will extend over the virtual boundary 408 into the larger area of maneuver 410 for turns, etc.).

However, according to further examples if obstacles are detected the operator may not be able to override and create the work plan 412 until a further recorded area is regenerated (e.g., repeated) and no obstacles are sensed.

However, as shown in FIG. 4C, should the operator decline to confirm (e.g., select "NO" or equivalent) in response to the warning, icon, etc. regarding obstacles, the controller 130 can reduce the area of actual compaction 414 in size from the potential area of compaction (the recorded area 406). This area of actual compaction 414 will not extend up to the virtual boundary 408 but instead will be spaced within the virtual boundary 408 by a buffer zone 416 that allows for the compactor to maneuver for turns, etc. without crossing the virtual boundary 408. The controller 130 will develop a second work plan 418 within the area of actual compaction 414 and the buffer zone 416. This second work plan 418 will differ from the work plan 412. This second work plan 418 will not allow the compactor to cross the virtual boundary 408. Put another way, the area of actual compaction 414 as dictated by the second work plan 418 will be spaced within the virtual boundary 408 by the buffer one 416.

INDUSTRIAL APPLICABILITY

The present disclosure provides apparatuses such as compactor 100, systems such as control systems 200, 300 and/or 400 and methods 202, 302 and/or 402 for defining a perimeter such as virtual boundary 208, 308 and 408 of a compaction area such as 210, 314 and 414 within a worksite. This perimeter is defined by operation of the compactor along at least a portion of the perimeter such as the first desired boundary 204, the second desired boundary 206 and/or the distinct points 304A, 304B, 304C and 304D to gather position data. This position data can be used by a controller such as the controller 130 to define the virtual boundary (e.g., virtual boundary 208, 308 and/or 408) within which the compactor 100 can compact. In some cases, if the compaction area 210, 314 and/or 414 extends up to the virtual boundary 208, 308 and/or 408, the compactor can operate outside the virtual boundary 208, 308 and/or 408 such as in the area of maneuver 310 and/or 410 to maneuver for turns, etc.

The systems such as the control systems 200, 300 and/or 400 and methods such as methods 202, 302 and/or 402 can rely on operator or other input (e.g., regarding obstacles within the recorded area 306 and/or 406 or in the area adjacent and outside the recorded area). The systems such as the control systems 200, 300 and/or 400 and methods 202, 302 and/or 402 can formulate a plurality of work plans (e.g., the first work plan 212, the work plan 312, the second work plan 318, the work plan 412 and/or the second work plan 418) and can revise/create/update a new work plan (e.g., the second work plan 318 and/or second work plan 418) in response to the operator (and/or sensors such as one or more obstacle detection sensors 128) indicating obstacles are present within or adjacent the recorded area 306 and/or recorded area 406 (e.g., the area originally intended for compaction).

The control systems 200, 300 and/or 400 and methods 202, 302 and/or 402 may be used to align the compaction area (compaction area 210, 314 and 414) with the perimeter such as the first desired boundary 204, the second desired boundary 206 and/or the distinct points 304A, 304B, 304C and 304D defined by the operator. As a result, the systems such as the control systems 200, 300 and/or 400 and methods such as methods 202, 302 and/or 402 can avoid a decrease in compaction area due to the automatic addition of a safety or buffer zone within the perimeter, while ensuring protection of personnel and equipment through the addition of the area of maneuver 310 and/or 410 outside of the virtual boundary 208, 308 and/or 408. As well, with the disclosed systems and methods, an operator can accurately define in advance the area of a worksite to be compacted, and additional steps of manually compacting areas automatically blocked for the safety or buffer zone in legacy systems can be avoided.

The above detailed description is intended to be illustrative, and not restrictive. The scope of the disclosure should, therefore, be determined with references to the appended claims, along with the full scope of equivalents to which such claims are entitled.

What is claimed is:

1. A control system for a compactor comprising:
one or more position sensors sensing data regarding a position of the compactor;
a steering system for steering the compactor along a desired path of travel;
a control interface for initiating a recording of the position of the compactor using the one or more position sensors when physically operating the compactor using the steering system along a desired boundary of a compaction area; and
a controller in communication with at least the control interface and the one or more position sensors, wherein the controller is configured to:
receive the data recording the position of the compactor when physically operating the compactor along at least a portion of the desired boundary of the compaction area;
determine from the data a virtual boundary of the compaction area corresponding to the position of the compactor when physically operating the compactor along the desired boundary of the compaction area;
generate at least a first work plan for operating the compactor to compact in the compaction area up to the virtual boundary; and
in response to an input by an operator using the control interface, generate a second work plan for operating the compactor to compact in the compaction area in a reduced area that is spaced from and within the virtual boundary by a buffer zone, wherein the buffer zone provides an area where the compactor may maneuver but not compact without crossing the virtual boundary, and wherein the controller is configured to via the control interface display the first work plan and the second work plan relative to the virtual boundary.

2. The control system of claim 1, further comprising one or more obstacle detection sensors mounted to the compactor for detecting one or more obstacles in a first area around the desired boundary of the compaction area, wherein the controller is in communication with the one or more obstacle detection sensors at least during the recording of the position of the compactor along the desired boundary of the compaction area.

3. The control system of claim 2, wherein the controller is configured to issue a warning prior to implementing the first work plan for operating the compactor if the one or more obstacle detection sensors detect the one or more obstacles in the first area around the desired boundary of the compaction area.

4. The control system of claim 1, wherein the controller is configured to issue a warning and receive verification by the operator via the control interface that no obstacles are present in the compaction area prior to implementing at least the first work plan.

5. The control system of claim 1, wherein the controller includes a memory to save the first work plan and the virtual boundary for subsequent use of the compactor within the compaction area without having to physically operate the compactor using the steering system along the desired boundary of the compaction area to revalidate the virtual boundary for the first work plan.

6. The control system of claim 1, wherein the virtual boundary is extrapolated from at least one of: a plurality of sensed points along the desired boundary of the compaction area or at least two steered paths of the compactor along a portion of the desired boundary of the compaction area.

7. The control system of claim 1, wherein a portion of the virtual boundary is extrapolated by the controller rather than being based upon the data recording the position of the compactor when physically operating the compactor.

8. A machine implemented method of controlling operation of a compactor, comprising:
recording one or more positions of the compactor while steering the compactor along a desired boundary of a compaction area;
using the recording of the one or more positions along the desired boundary to define a virtual boundary generated by a controller of the compactor;
detecting via one or more sensors one or more obstacles in a first area around the desired boundary of the compaction area;
providing one or more prompts to an operator regarding a presence of one or more obstacles in or adjacent the compaction area; and
determining a work plan for the compactor to compact within the compaction area according to response by the operator to the one or more prompts and the virtual boundary, wherein the work plan for the compactor to compact within the compaction area extends up to the virtual boundary, wherein based upon the operator response to the one or more prompts, the work plan provides for an area of maneuver that allows the compactor to perform turns without compacting vibration outside of the virtual boundary.

9. The method of claim 8, wherein the providing one or more prompts to the operator regarding the presence of one or more obstacles in or adjacent the compaction area includes a prompt that one or more obstacles were detected by the one or more sensors.

10. The method of claim 8, wherein the operator must verify the one or more prompts for the work plan to be generated.

11. The method of claim 8, wherein recording the one or more positions of the compactor while steering the compactor along the desired boundary of the compaction area occurs at one of: a plurality of points along the desired boundary or along at least two steered paths of the compactor along a portion of the desired boundary of the compaction area.

12. The method of claim 8, wherein at least a portion of the virtual boundary is extrapolated by the controller based upon the recording the one or more positions of the compactor while steering the compactor along only a portion of a desired boundary of the compaction area.

13. A compactor comprising:
a substantially cylindrical drum configured to compact a surface as the compactor traverses a work area;
a frame supporting the drum;
a steering system for steering the compactor along a desired path of travel;
one or more position sensors sensing a location of the compactor;
a control interface for initiating a recording of the location of the compactor using the one or more position sensors when physically operating the compactor using the steering system along a desired boundary of a compaction area; and
a controller in communication with at least the control interface and the one or more position sensors, wherein the controller is configured to:
receive data recording the location of the compactor when physically operating the compactor along at least a portion of the desired boundary of the compaction area;
determine from the data a virtual boundary of the compaction area corresponding to the location of the compactor when physically operating the compactor along the desired boundary of the compaction area;
provide one or more prompts to an operator regarding a presence of one or more obstacles in or adjacent the compaction area;
generate at least a first work plan for operating the compactor to compact in the compaction area up to the virtual boundary; and
based upon the operator response to the one or more prompts, generate an area of maneuver that allows the compactor to perform turns without compacting vibration outside of the virtual boundary.

14. The compactor of claim 13, further comprising one or more obstacle detection sensors mounted to the compactor for detecting one or more obstacles in a first area around the desired boundary of the compaction area, wherein the controller is in communication with the one or more obstacle detection sensors at least during the recording of the location of the compactor along the desired boundary of the compaction area, wherein the controller is configured to issue a warning prior to implementing the first work plan for operating the compactor if the one or more obstacle detection sensors detect the one or more obstacles in the first area around the desired boundary of the compaction area.

15. The compactor of claim 14, wherein, in response to an operator prompt using the control interface, the controller generates a second work plan for operating the compactor to compact in the compaction area in a reduced area that is spaced from and within the virtual boundary by a buffer zone, wherein the buffer zone provides an area where the compactor may maneuver but not compact, and wherein controller is configured to via the control interface display the first work plan and the second work plan relative to the virtual boundary.

16. The compactor of claim 13, wherein the controller is configured to issue a warning and receive an operator verification via the control interface that no obstacles are present in the compaction area prior to implementing at least the first work plan.

17. The compactor of claim 13, wherein the virtual boundary is extrapolated from at least one of: a plurality of sensed points along the desired boundary of the compaction area or at least two steered paths of the compactor along a portion of the desired boundary of the compaction area.

18. The compactor of claim 13, wherein a portion of the virtual boundary is extrapolated by the controller rather than being based upon the location of the compactor.

19. The compactor of claim 13, wherein the compactor is operable in the area of maneuver that extends outside the virtual boundary in response to an operator prompt using the control interface.

* * * * *